(12) United States Patent
Gombert et al.

(10) Patent No.: US 11,618,388 B2
(45) Date of Patent: Apr. 4, 2023

(54) FRONT TRUNK ASSEMBLY

(71) Applicant: Ford Global Technologies, LLC, Dearborn, MI (US)

(72) Inventors: Greg Gombert, Canton, MI (US); Leonard Anthony Shaner, New Baltimore, MI (US); Sukhwinder Singh Dhindsa, Windsor (CA); Vinay Satya, Auburn Hills, MI (US); Mikolaj Tyksinski, Madison, WI (US); Marcela Arana, Plymouth, MI (US); Mary A. Mason, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 17/155,023

(22) Filed: Jan. 21, 2021

(65) Prior Publication Data
US 2022/0227299 A1 Jul. 21, 2022

(51) Int. Cl.
*B60R 5/02* (2006.01)
*B62D 21/15* (2006.01)
*B60R 19/18* (2006.01)
*B60R 21/00* (2006.01)

(52) U.S. Cl.
CPC .............. *B60R 5/02* (2013.01); *B60R 19/18* (2013.01); *B62D 21/152* (2013.01); *B60R 2019/1806* (2013.01); *B60R 2021/0004* (2013.01)

(58) Field of Classification Search
CPC ... B60R 5/02; B60R 19/18; B60R 2019/1806; B60R 2021/0004; B62D 21/152; B62D 25/082; B62D 25/085; B62D 25/087
See application file for complete search history.

(56) References Cited

U.S. PATENT DOCUMENTS

| 3,595,335 | A | * | 7/1971 | Wessells, III | ........ | B62D 25/087 |
| | | | | | | 180/274 |
| 6,276,477 | B1 | * | 8/2001 | Ida | .......................... | B62D 21/10 |
| | | | | | | 296/193.04 |
| 6,755,461 | B2 | * | 6/2004 | Seksaria | ................. | B60R 19/03 |
| | | | | | | 296/203.02 |
| 8,128,160 | B2 | * | 3/2012 | Leanza | ................ | B62D 25/082 |
| | | | | | | 296/203.02 |
| 9,440,527 | B1 | * | 9/2016 | Maeda | ................... | B60K 11/04 |
| 9,527,450 | B1 | * | 12/2016 | Bellis | ................... | B62D 25/082 |

(Continued)

FOREIGN PATENT DOCUMENTS

| CN | 206885184 | U | | 1/2018 |
| DE | 102020114935 | B3 | * | 5/2021 |
| KR | 10-2013-0068961 | A | | 6/2013 |

*Primary Examiner* — Laura Freedman
(74) *Attorney, Agent, or Firm* — Vichit Chea; Carlson, Gaskey & Olds, P.C.

(57) ABSTRACT

A vehicle includes a hood at a front end, a frunk under the hood, and a cabin. The vehicle includes a cross-beam positioned between the frunk and the cabin, and configured to inhibit protrusion of the frunk into the cabin in a frontal impact. The vehicle also includes a frame and the cross-beam is coupled to the frame. The cross-beam is a unitary member that is coupled to the frame or the cross-beam includes two members separated by a gap and each member is coupled to the frame. The frame includes shock towers for coupling the cross-beam to the frame. The frame can also include a bracket for coupling the cross beam to the frame.

8 Claims, 7 Drawing Sheets

(56) References Cited

U.S. PATENT DOCUMENTS

| | | | |
|---|---|---|---|
| 9,758,125 B2* | 9/2017 | Matsushima | B62D 25/08 |
| 10,195,999 B1* | 2/2019 | Glickman | B62D 25/085 |
| 10,625,784 B2* | 4/2020 | Stenvall | B60L 50/64 |
| 10,710,424 B2* | 7/2020 | Eckert | B60L 50/66 |
| 10,953,721 B2* | 3/2021 | Gruber | H01M 10/615 |
| 10,988,070 B2* | 4/2021 | Subramanian | B60P 7/0823 |
| 11,198,474 B2* | 12/2021 | Jeong | B62D 21/08 |
| 11,254,368 B2* | 2/2022 | Park | B62D 21/11 |
| 11,325,656 B2* | 5/2022 | Glickman | B60R 7/02 |
| 11,420,565 B2* | 8/2022 | Ritter | B60R 13/013 |
| 11,458,901 B2* | 10/2022 | Mazzarella | B60R 13/011 |
| 2019/0118692 A1 | 4/2019 | Qui et al. | |
| 2021/0114525 A1* | 4/2021 | Mazzarella | B32B 5/245 |
| 2021/0284242 A1* | 9/2021 | Yamaoka | B60R 13/013 |
| 2022/0105989 A1* | 4/2022 | Cote | B60R 5/02 |

* cited by examiner

FRONT TRUNK ASSEMBLY

BACKGROUND

Technical Field

The present disclosure is directed to a front trunk assembly.

Description of the Related Art

Some vehicles include a combustion engine in a rear location as opposed to a front, under hood location such that a front area is available for storage, e.g. a front trunk or frunk. Other vehicles such as electric vehicles may include a frunk in the front end, as the components for operation of the electric vehicle can be positioned in locations other than the traditional under hood region. Many frunks include a cavity or a depression, referred to as a cubby that can be used for storing luggage, cargo, tools, etc.

BRIEF SUMMARY

The present disclosure is directed to a front trunk or frunk assembly that is configured to deform or otherwise absorb energy in an event of a frontal collision. The front trunk assembly includes a cross-beam that between a frunk and a cabin or passenger compartment of a vehicle. The cross-beam absorbs energy in response to the frunk experiencing an impact and reduces the impact or movement of electronic components and other components towards the cabin. The size and shape of the frunk are configured to partially deform to absorb energy and reduce the movement of other components towards the cabin. The frunk in conjunction with the cross-beam limit the movement of these components and other components in an under hood area in a direction of the cabin.

The cross-beam is a unitary member that is coupled to a frame of the vehicle. Alternatively, the cross-beam may include two portions separated by a gap with each portion coupled to the frame using shock towers. A bracket for coupling the cross beam to the frame may be included. The cross-beam is bolted or otherwise coupled to the frame. The cross-beam has a central portion that is closer to a front end of the vehicle than a first end and a second end of the cross-beam.

In some embodiments, the frunk includes a floor or a bottom surface with an opening and a recessed storage compartment in the floor. The recessed storage compartment includes a sidewall that delimits the compartment. The cross-beam is positioned between the sidewall and the cabin and is configured to interact with the sidewall of the recessed storage compartment in the event of an impact. The cross-beam is configured to rotate the frunk and the frunk is configured to partially deform to absorb the impact.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
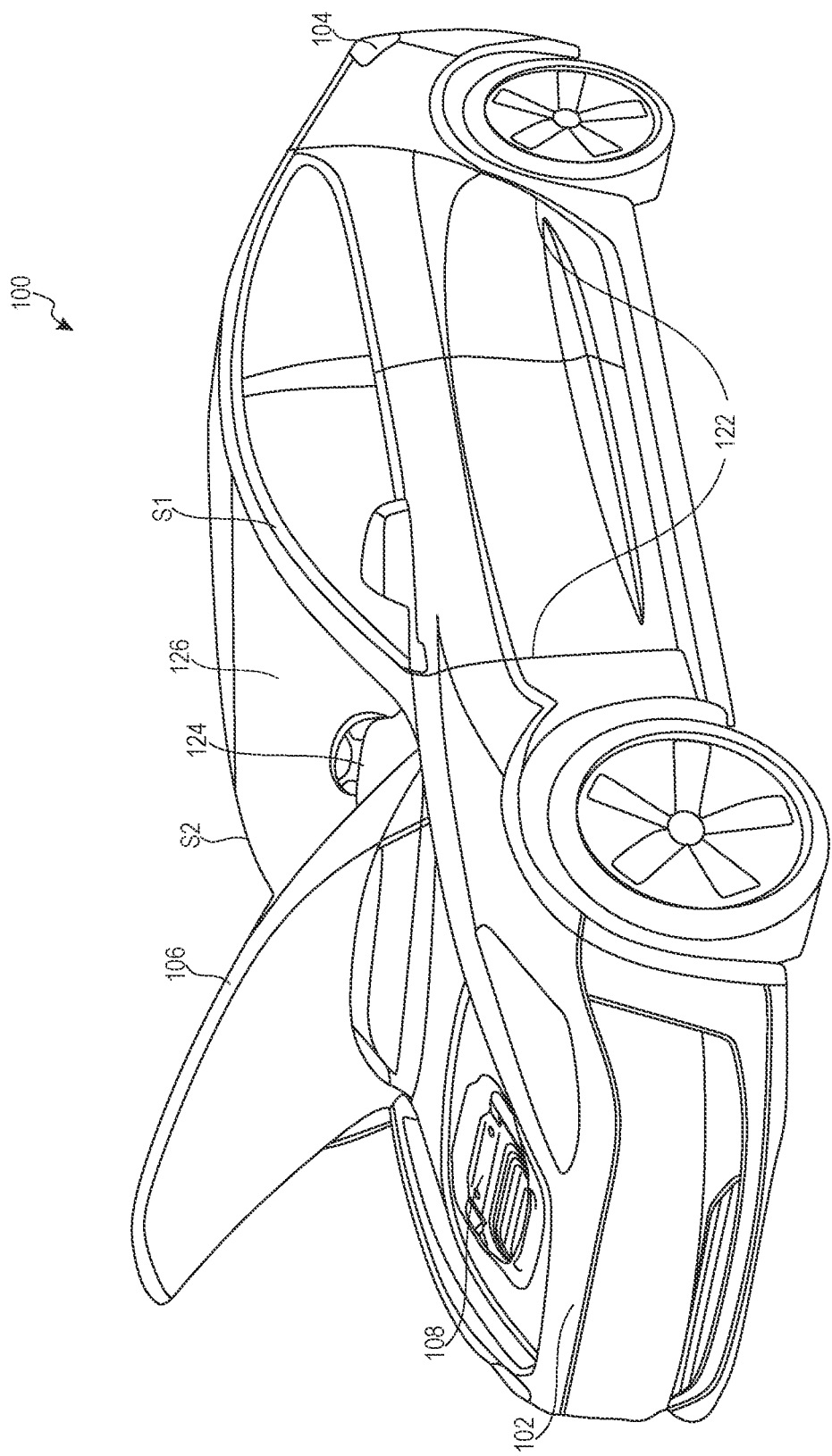
FIG. 1A is a front perspective view of a vehicle having a frunk in accordance with an embodiment of the present disclosure.
Figure 1B:
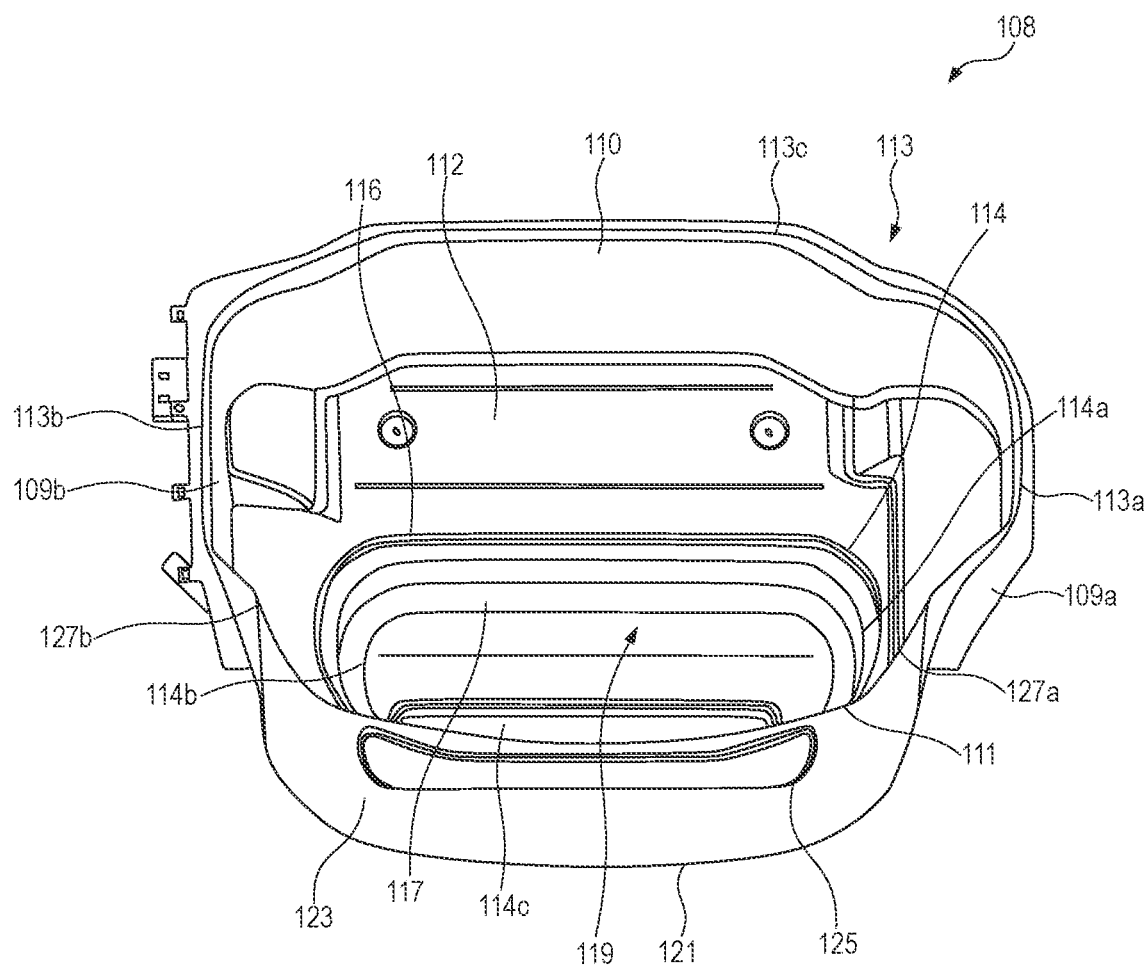
FIG. 1B is a top view of the frunk of the vehicle of FIG. 1A.

FIG. 1A is a front perspective view of a vehicle 100. FIG. 1B is a top view of a front trunk or frunk 108, in the vehicle 100, according to one embodiment of the present disclosure. The vehicle 100 can be an electric vehicle or may have a non-traditional engine position that does not include a combustion engine under a hood 106. A usable space is available under the hood, which can include the frunk 108 among other features.

The vehicle 100 includes a front end 102 separated from a rear end 104 by a cabin 122. The cabin or passenger compartment 122 includes a dash or an instrument panel 124 and an occupant space 126.

The hood 106 is between the front end 102 of the vehicle 100 and the dash 124 of the cabin 122. The frunk 108 is a storage compartment or a storage bin in the front end 102 of the vehicle 100. The frunk 108 is under the hood 106 in a space or a cavity formed by the front end 102 and front structural features of the vehicle 100. The frunk 108 is available to support luggage, cargo, or other items. The frunk 108 may be made of a polymer material, for example, plastic, carbon fiber, or a combination of polymer materials.

Figure 2A:
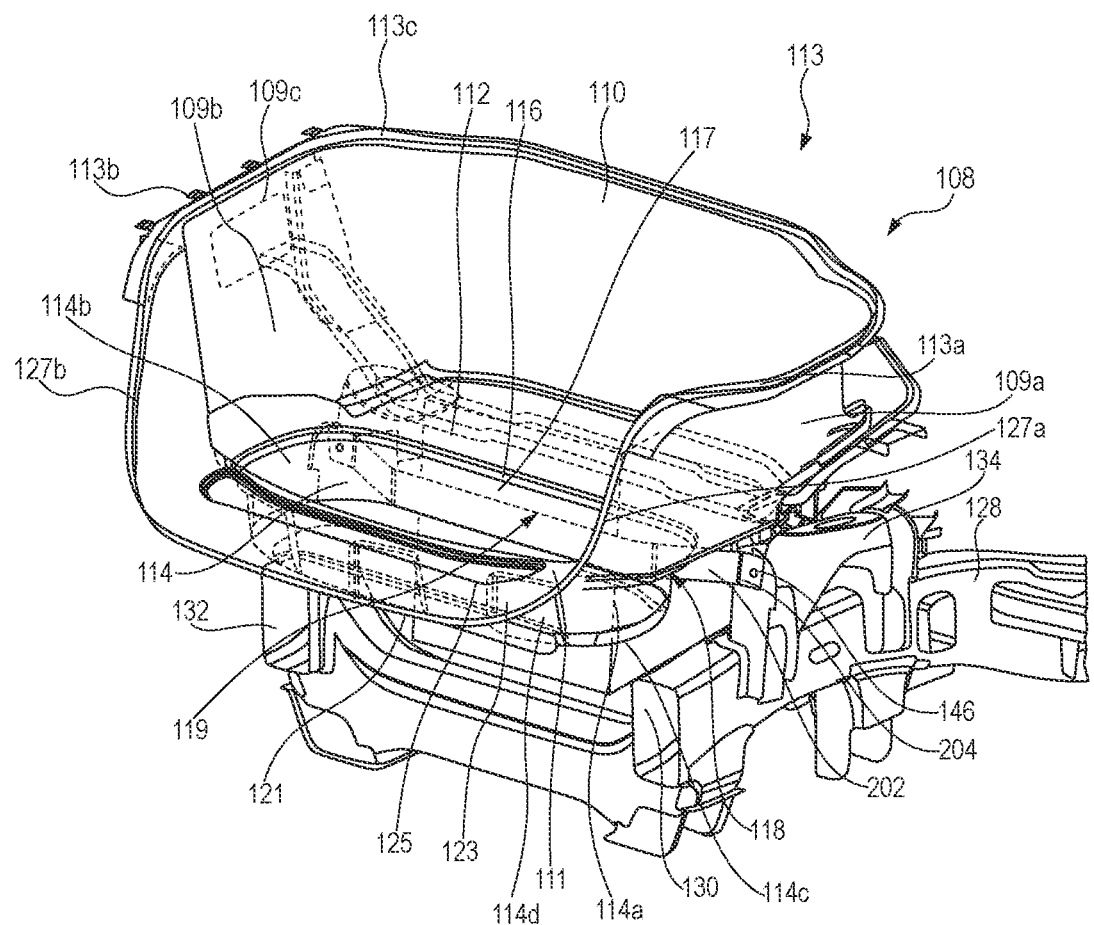
FIG. 2A is an enhanced perspective view of a frunk and a cross-beam.
Figure 2B:
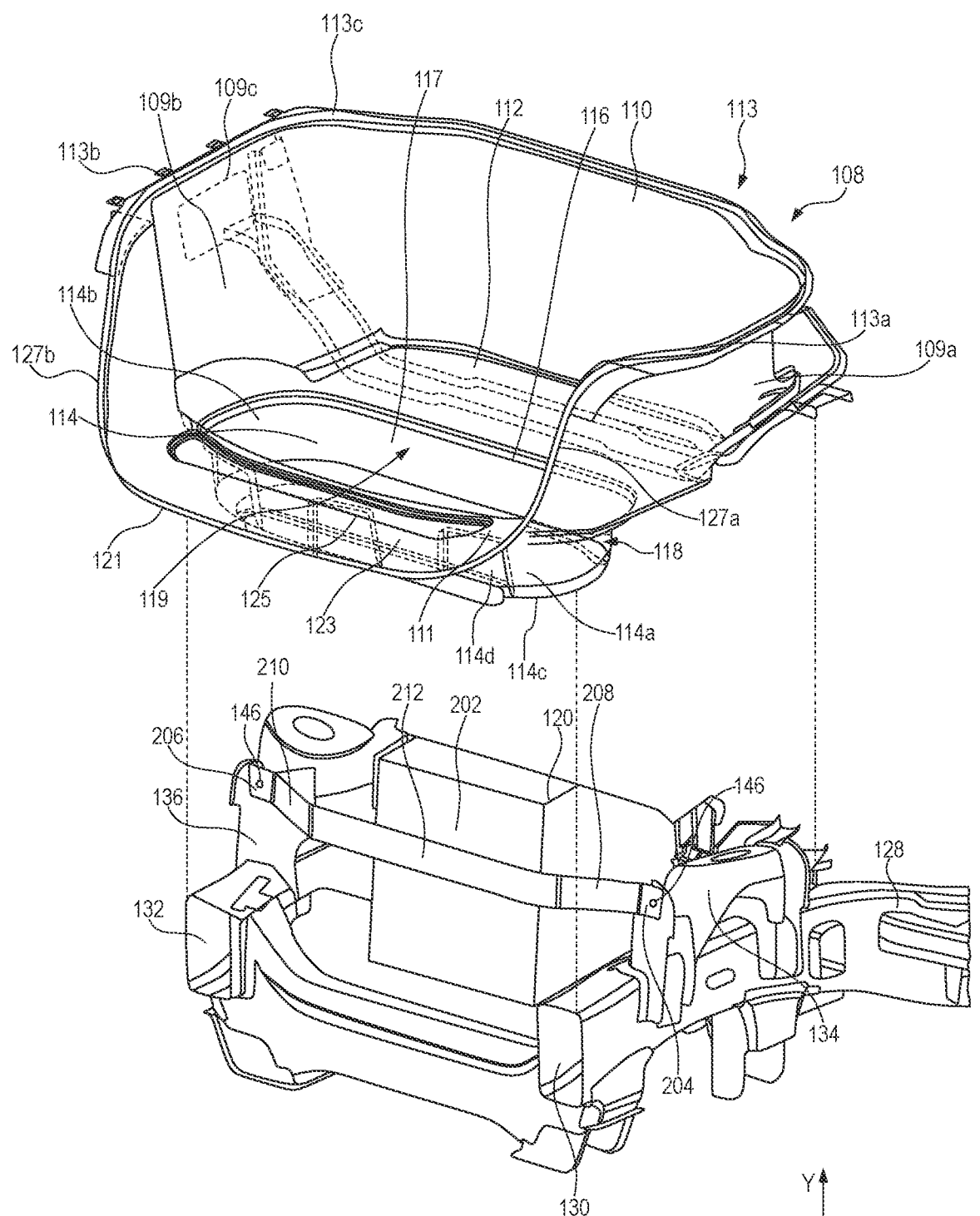
FIG. 2B is an exploded view of the frunk and the cross-beam of FIG. 2A.
Figure 3:
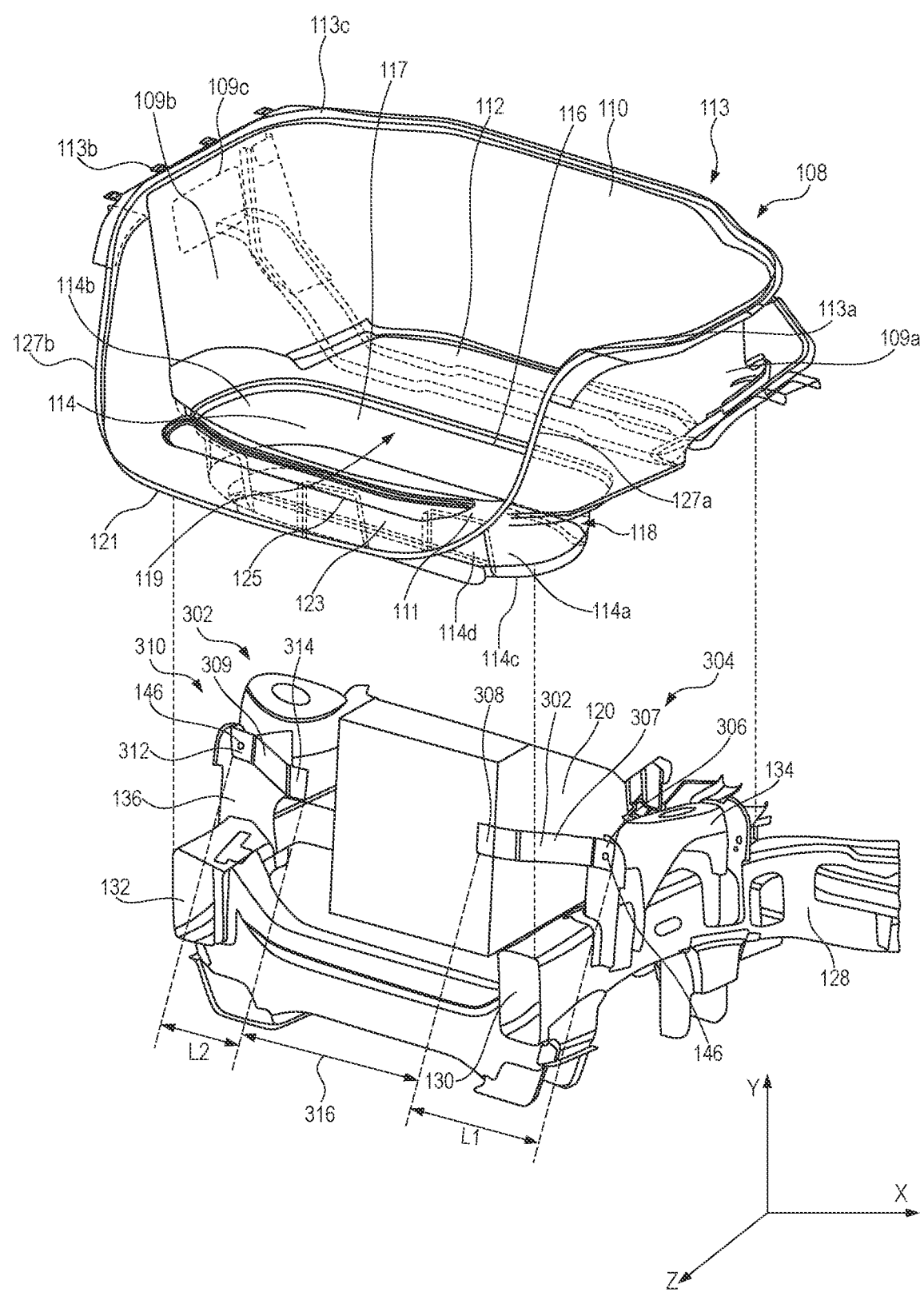
FIG. 3 is an exploded view of the frunk and another embodiment of a cross-beam.

The frunk 108 is attached to a frame 128, illustrated in FIGS. 2A, 2B, and 3. The frunk 108, as illustrated in FIG. 1B, includes a first sidewall 109a on a driver side S1 and a second sidewall 109b on a passenger side S2. The frunk 108 includes a frunk front sidewall 111 or a frunk frontwall 111, positioned between the first sidewall 109a and the second sidewall 109b. The frunk frontwall 111 includes a front edge 121 and an extension 123 that extends up to the front edge 121. The extension 123 with an indentation 125 may provide a grip to hold the frunk 108 during removal from the vehicle 100 or may be storage. The frunk 108 includes an upper edge 113 that is coupled to a floor 112 by the first and second sidewalls 109a and 109b.

The frunk 108 includes an asymmetrical interior area formed by a plurality of curved portions 127a-b. A first curved portion 127a and a second curved portion 127b, extend from the upper edge 113 to a floor 112. The first and second curved portions 127a and 127b are adjacent to the first sidewall 109a and the second sidewall 109b, respectively. The first curved portion 127a connects the first sidewall 109a with the front edge 121 and the second curved portion 127b connects the second sidewall 109b with the front edge 121. The frunk 108 is asymmetric as the first curved portion 127a and the second curved portion 127b may be dissimilar. The first curved portion 127a of the first sidewall 109a likely accommodates mechanical and electrical components in the cavity of the under hood region in which the frunk 108 is positioned. The second sidewall 109b may include an opening 109c that allows access to the under hood region.

The frunk 108 includes a rear sidewall 110, which is a frunk backwall 110, in between the first sidewall 109a and the second sidewall 109b, and closer to the cabin 122. The frunk backwall 110 is opposite to the frunk front wall 111, which is closer to the front end 102 or a bumper of the vehicle 100 and farther from the cabin 122 compared to the frunk backwall 110. The first sidewall 109a is coupled with the frunk backwall 110 and the second sidewall 109b is coupled with the frunk backwall 110 by curved corner walls.

The frunk 108 includes the upper edge 113 that is positioned closer to the hood 106 of the vehicle 100 compared to other edges. The upper edge 113 includes a driver side edge 113a on the first sidewall 109a, a passenger side edge 113b on the second sidewall 109b, and a backwall edge 113c on the frunk backwall 110.

The frunk 108 includes a first bottom surface 112, that is, the floor 112 or a shelf, adjacent to the frunk backwall 110, and the floor 112 includes an opening 116 between the frunk frontwall 111 and the floor 112. The first sidewall 109a and the second sidewall 109b extend from the driver side edge 113a and the passenger side edge 113b to the floor 112. The opening 116 allows access to interiors of an indentation 114, where the indentation 114 is a recessed storage compartment 114 or a cubby 114. The compartment 114 is positioned below the floor 112 and includes a second bottom surface 114c that is parallel to the floor 112. The second bottom surface 114c is farther from the hood 106 compared to the floor 112.

The compartment 114 includes a first curved sidewall 114a closer to the driver side S1 and a second curved sidewall 114b closer to the passenger side S2 of the vehicle 100 respectively. The first curved sidewall 114a and the second curved sidewall 114b are coupled to opposing ends of the second bottom surface 114c. The first and second curved sidewalls 114a, 114b are separated by the second bottom surface 114c along a Z-axis. The compartment 114 includes a sidewall which is a recess rear sidewall or a recess rearwall 117, in between the second bottom surface 114c and the cabin 122, along the X-axis. The recess rearwall 117 extends between the first curved sidewall 114a and the second curved sidewall 114b. The recess rearwall 117 includes an exterior surface 118 referred to as a recess backwall 118, illustrated in FIGS. 2A, 2B, 3, and 4A, that faces towards the cabin 122 of the vehicle 100 and an interior surface 119 that faces the second bottom surface 114c.

The compartment 114 along with the first curved sidewall 114a and the second curved sidewall 114b is oval, and in another implementation, the compartment 114 is of a shape other than oval. The compartment 114 includes a recess front sidewall 114d or a recess frontwall 114d, illustrated in FIG. 2A, in between the first curved sidewall 114a and the second curved sidewall 114b. The recess frontwall 114d is spaced by the second bottom surface 114c from the interior surface 119. The recess frontwall 114d is positioned between the frunk frontwall 111 and the second bottom surface 114c. FIG. 2A is an enhanced perspective view of the frunk 108 and a cross-beam 202. FIG. 2B is an exploded view of the frunk 108 and the cross-beam 202 of FIG. 2A. Electronic components 120 such as a DC charger/inverter, an electric motor, etc., illustrated in FIGS. 2B and 3, are positioned under the hood 106 and behind the frunk 108 towards the cabin 122. The electronic components 120, illustrated in FIG. 2B, are positioned in a space between the frame 128 and below the hood 106. The frame 128 is a primary supporting structure of the vehicle 100 that facilitates attachment of one or more components of the vehicle 100. The frame 128 includes a driver-side frame 130, and a passenger-side frame 132 proximal to the driver side S1 and the passenger side S2, respectively. The frame 128 includes a first shock tower 134 coupled to the driver-side frame 130 and a second shock tower 136 coupled to the passenger-side frame 132.

The cross-beam 202 is positioned between the frunk 108 and the dash 124 of the cabin 122, transverse or otherwise perpendicular to the frame 128. Specifically, the cross-beam 202 is bolted to the frame 128 by a fastener 146 and positioned in between the driver-side frame 130 and the passenger-side frame 132, extending in a lateral direction between the driver-side frame 130 and the passenger-side frame 132. The cross-beam 202 inhibits a rearward movement of the frunk 108 towards the dash 124 or the cabin 122 (along an X-axis) in an event of a frontal crash or a frontal impact. The cross-beam 202 may be in the range of 2 and 3 millimeters (mm) or about 2.5 mm thick in an embodiment.

As illustrated in FIGS. 2A and 2B, the cross-beam 202 is a unitary member and includes a first end 204 and a second end 206. The first end 204 is coupled to the first shock tower 134 and the second end 206 is coupled to the second shock tower 136 using the fastener 146, such as a screw, bolt, or by welding, etc., or a combination thereof. Alternatively, the first end 204 of the cross-beam 202 may be coupled directly to the driver-side frame 130 and the second end 206 may be coupled to the passenger-side frame 132. In addition, the first shock tower 134 and the second shock tower 136, or the frame 128, may include one or more brackets for coupling with the cross-beam 202.

The cross-beam 202 further includes a middle portion 212, a first intermediate member 208 extends between the middle portion 212 and the first end 204, and a second intermediate member 210 extends between the middle portion 212 and the second end 206.

The middle portion 212 extends from the first intermediate member 208 to the second intermediate member 210 and protrudes towards the recess backwall 118 of the frunk. The middle portion 212 is closer to the front end 102 of the vehicle 100 and to the recess backwall 118 as compared to the first and the second intermediate members 208, 210 respectively, and the first and the second ends 204, 206 respectively. The middle portion 212 of the cross-beam 202 is positioned at a distance 402 from the recess backwall 118, illustrated in FIG. 4A. The first and the second intermediate members 208, 210 extend away from the middle portion 212 at an angle towards the cabin.

The cross-beam 202 is positioned behind the recess backwall 118, that is, between the recess backwall 118 and the cabin 122. The cross-beam 202 is positioned such that the middle portion 212 contacts the recess backwall 118 during the frontal impact of the vehicle 100. Alternatively, the cross-beam 202 is positioned such that at least one of the first end 204, the second end 206, first intermediate member 208, the second intermediate member 210, or the middle portion 212 contacts the recess backwall 118 or other parts of the frunk in the frontal impact of the vehicle 100. The shape of the cross-beam 202 is based on the shape and dimension of the recessed storage compartment 114 to facilitate the cross-beam 202 to engage with the recess backwall 118 of the frunk 108 during a collision.

The cross-beam 202 acts as a barrier between the frunk 108 and the cabin 122 during the frontal impact, by restricting or impeding the rearward movement of the frunk 108 or the compartment 114, along the X-axis, towards the dash 124 of the cabin 122. The restriction from the cross-beam 202 aids in substantially reducing the impact of the compartment 114 on electronic components 120. The cross-beam 202, accordingly, prevents or reduces the intrusion of the electronic components 120 into the dash 124. The cross-beam causes the frunk to rotate when the cross-beam interacts with the recess or other wall of the frunk.

Alternatively, the cross-beam 202 can be positioned between the frunk backwall 110, illustrated in FIGS. 2A and 2C, and the dash 124 to contact the frunk backwall 110 during the frontal impact of the vehicle 100 and restrict the rearward movement of the frunk 108 along the X-axis. In another embodiment, the frunk 108 does not include the recessed storage compartment 114, and the cross-beam 202 is positioned between the frunk backwall 110 and the cabin 122.

FIG. 3 is an exploded view of the frunk 108 and another embodiment of a cross-beam 302. The cross-beam 302 includes a first member 304 and a second member 310. The first member 304 and the second member 310 are separated from each other by a gap 316. The first member 304 has a first length L1 and the second member 310 has a second length L2. The first length L1 and the second length L2 are equal. Alternatively, the first length L1 and the second length L2 can be different. The cross-beam 302 is made of metal, for example, steel, aluminum, etc.

The first member 304 includes a first connector portion 306, a first intermediate member 307, and a first free, floating portion 308. The second member 310 includes a second connector portion 312, a second intermediate member 309, and a second free portion 314. The first connector portion 306 is coupled to the first shock tower 134 and the second connector portion 312 is coupled to the second shock tower 136 by the fastener 146. Alternatively, the first connector portion 306 is coupled directly to the driver-side frame 130 and the second connector portion 312 is coupled directly to the passenger-side frame 132. In addition, the first shock tower 134 and the second shock tower 136, or the frame 128, may include one or more brackets for coupling with the cross-beam 302.

The first and second intermediate members 307, 309 extend from the first and second connector portions 306, 312 respectively to the first and second free or uncoupled portions 308, 314, respectively. The first free portion 308 and the second free portion 314 extend laterally with the gap 316 in between. The first free portion 308 extends towards the passenger-side frame 132 and the second free portion 314 extends towards the driver-side frame 130. The first free portion 308 is positioned to face the second free portion 314. In addition, the first free portion 308 and the second free portion 314 extend towards the hood 106. The first free portion 308 and the second free portion 314 are closer to the front end 102 of the vehicle 100 than the first connector portion 306 and the second connector portion 312 of the cross-beam 302.

The cross-beam 302 is positioned in a way similar to the cross-beam 202, illustrated in FIG. 2B. The first and second free portions 308, 314 respectively are positioned and function in a way similar to the middle portion 212 of cross-beam 202, illustrated in FIG. 2B. The cross-beam 302 is positioned, such that at least one of the first free portion 308, the second free portion 314, the first connector portion 306, the first intermediate member 307, the second intermediate member 309, or the second connector portion 312 contacts the recess backwall 118 during the frontal impact of the vehicle 100. Alternatively, the cross-beam 302 can be positioned behind the frunk backwall 110 and is configured to contact the frunk backwall 110 during the frontal impact.

The cross-beam 302 prevents or reduces the intrusion of the electronic components 120 into the dash 124 during the frontal impact, similar to the cross-beam 202 discussed in the detailed description of FIGS. 2A and 2B.

Figure 4A:
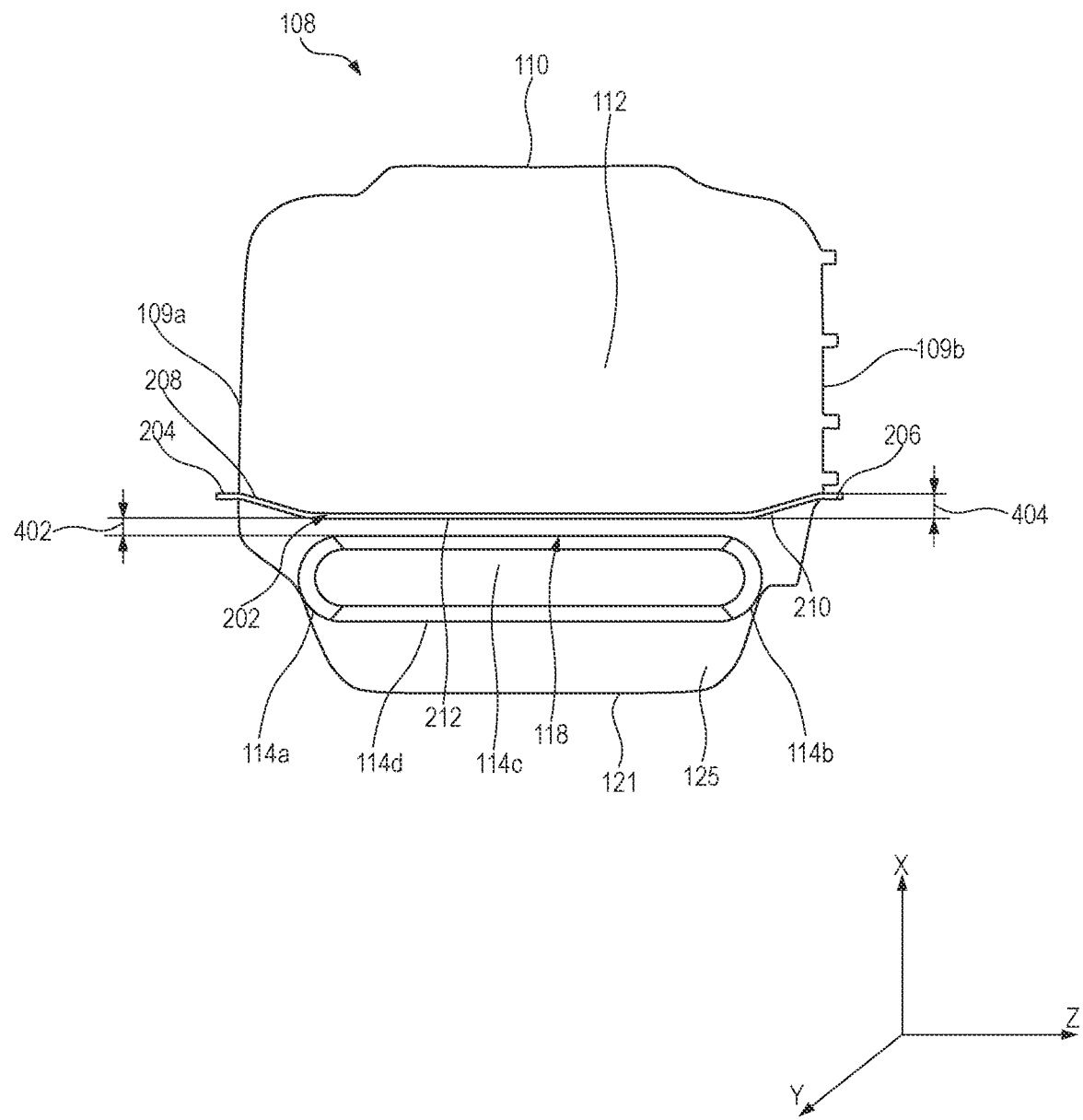
FIGS. 4A and 4B are a simplified bottom view of the cross-beam and the frunk of FIG. 2A.

FIG. 4A is a bottom view of the embodiment of the cross-beam 202, illustrated in FIG. 2A, in a resting position. The middle portion 212 of the cross-beam 202 is positioned at the distance 402 from the recess backwall 118. A distance 404 exists between the middle portion 212 and the first end 204 or the second end 206 along the X-axis. The distance 404 may allow the middle portion 212 to have a clearance to absorb impact during the frontal collision. During the collision, the compartment 114 can move up to the distance 402 to contact the middle portion 212 and crumple the cross-beam 202. The middle portion 212 that begins to crumple can move up to the distance 404 and the compartment 114 can move for at least a sum of the distances 402 and 404 to advance towards the cabin 122 beyond the cross-beam 202. In an implementation, the distance 402 is lesser than the distance 404. In another implementation, the distance 402 is equal or greater than the distance 404.

Figure 4B:
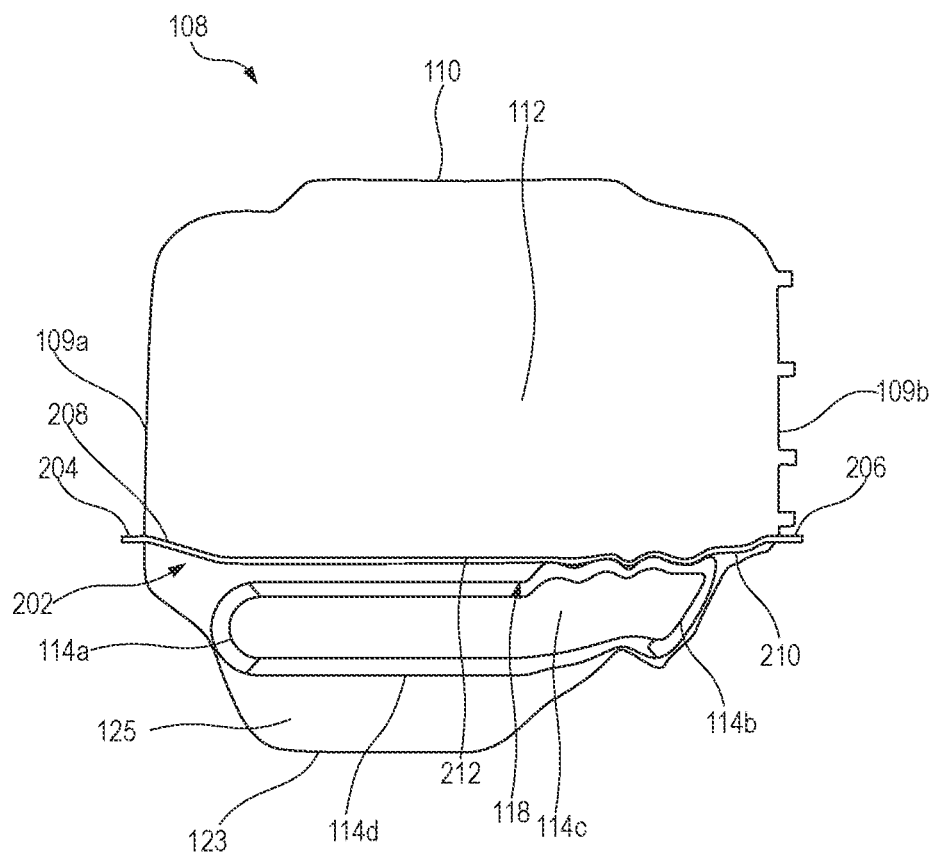

FIG. 4B is a bottom view of the embodiment of the cross-beam 202, illustrated in FIG. 2A, when in contact with the recessed storage compartment 114 of the frunk 108 due to the frontal impact. Upon experiencing the frontal impact, the frunk 108, along with the compartment 114, moves rearward along the X-axis towards the cabin 122, and the recess backwall 118 engages with the middle portion 212 of the cross-beam 202. As the frunk 108 continues to experience the frontal impact, the compartment 114 and the frunk 108 continue to move rearward towards the cabin 122. The width and the thickness of the cross-beam 202 allow the cross-beam 202 to suppress the rearward movement of the compartment 114 upon connecting with the compartment 114. The cross-beam 202 supports the compartment 114 to absorb the frontal impact and crumples or deforms due to the impact, the cross-beam 202 is configured to deform the compartment 114. With the support from the cross-beam 202, the compartment 114 and the sidewalls 114a, 114b, 114d, and 117, may experience a crush due to the frontal impact with minimal rearward movement along the X-axis and minimal push to the electronic components 120.

The cross-beam 202 may curb the impact of the compartment 114 on the electronic components 120 and further on the dash 124, illustrated in FIG. 4B.

Alternatively, the cross-beam 202 is positioned behind the frunk backwall 110 and configured to absorb the frontal impact and deform the frunk 108 during the frontal impact. The cross-beam 202 reduces the extent of invasion of the dash 124 into footwell region (not shown) of the vehicle 100 due to the movement of the compartment 114 or the frunk 108 and the electronic components 120. For example, the cross-beam 202 reduces the intrusion of dash 124 in the footwell regions by about 50 mm on the driver side S1 of the vehicle 100 and about 30 mm on the passenger side S2 of the vehicle 100.

In an alternate implementation, the cross-beam 202 is configured to deflect and force the frunk 108 or the compartment 114 to rotate upward along the Y-axis, towards the hood 106, when the recess backwall 118 connects with the cross-beam 202, during the frontal impact. The frunk 108 rotates about Y-axis and may reduce the rearward displacement or movement along the X-axis, and accordingly may enable lower intrusion extent.

The cross-beam 302, illustrated in FIG. 3, may curb the impact of the frunk 108 or the recessed storage compartment 114 on the electronic components 120 and further on the dash 124, in a way similar to the cross-beam 202.

The terms "first," "second," and similar indicators of sequence are to be construed as interchangeable.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
   a hood at a front of the vehicle;
   a front trunk under the hood;
   a cabin;
   a cross-beam positioned between the front trunk and the cabin; and
   a frame, the cross-beam being coupled to the frame, the cross-beam completely outside the front trunk,
   wherein the cross-beam is a unitary member including:
      a first end coupled to the frame on a driver side of the vehicle; and
      a second end coupled to the frame on a passenger side of the vehicle;
   wherein the cross-beam includes a middle portion closer to a front end of the vehicle than are the first end and the second end.

2. The vehicle of claim 1, wherein the frame includes a shock tower, the cross-beam being coupled to the shock tower.

3. The vehicle of claim 1, further comprising a bracket coupling the cross-beam to the frame.

4. The vehicle of claim 1, wherein the cross-beam is steel.

5. A vehicle, comprising:
   a front trunk;
   a cabin;
   a frame; and
   a cross-beam coupled to the frame and positioned between the front trunk and the cabin,
   wherein the front trunk includes:
      a bottom surface including an opening; and
      a recessed storage compartment in the bottom surface, the recessed storage compartment including:
         a sidewall, the cross-beam being positioned between the sidewall and the cabin;
   wherein the cross-beam is positioned outside the front trunk between all portions of the front trunk and the cabin, wherein the cross-beam is positioned to contact the sidewall of the recessed storage compartment in a frontal impact of the vehicle.

6. The vehicle of claim 5, wherein the cross-beam is bolted to the frame.

7. The vehicle of claim 5, wherein the cross-beam includes steel with a thickness greater than or equal to 2.5 mm.

8. The vehicle of claim 5, wherein the cross-beam has a width between 2 inches and 6 inches.

* * * * *